(12) United States Patent
Lee

(10) Patent No.: US 10,286,827 B2
(45) Date of Patent: May 14, 2019

(54) POSITION ADJUSTING DEVICE OF FOOTREST FOR CAR SEAT

(71) Applicant: Myung Joo Lee, Seoul (KR)

(72) Inventor: Myung Joo Lee, Seoul (KR)

( * ) Notice: Subject to any disclaimer, the term of this patent is extended or adjusted under 35 U.S.C. 154(b) by 0 days.

(21) Appl. No.: 15/795,326

(22) Filed: Oct. 27, 2017

(65) Prior Publication Data

US 2018/0118074 A1  May 3, 2018

(30) Foreign Application Priority Data

Nov. 1, 2016 (KR) ........................ 10-2016-0144629

(51) Int. Cl.
| | |
|---|---|
| *B60N 2/26* | (2006.01) |
| *B60N 2/28* | (2006.01) |
| *B60N 3/06* | (2006.01) |
| *B62B 9/00* | (2006.01) |

(52) U.S. Cl.
CPC ............... *B60N 3/063* (2013.01); *B60N 2/26* (2013.01); *B60N 2/286* (2013.01); *B62B 9/00* (2013.01)

(58) Field of Classification Search
CPC .......... B60N 3/063; B60N 2/26; B60N 2/286; B62B 9/00
USPC ...................... 297/338, 353, 411.36, 423.38
See application file for complete search history.

(56) References Cited

U.S. PATENT DOCUMENTS

| | | | | |
|---|---|---|---|---|
| 2,308,358 | A * | 1/1943 | Cramer | ..................... A47C 3/26 297/423.38 X |
| 2,659,413 | A * | 11/1953 | Cramer | ..................... A47C 3/34 297/423.38 X |
| 5,551,754 | A * | 9/1996 | Neumueller | ........... A47C 7/402 297/353 |

(Continued)

FOREIGN PATENT DOCUMENTS

| | | |
|---|---|---|
| DE | 20006291 U1 | 7/2000 |
| EP | 2439102 A2 | 4/2012 |

(Continued)

OTHER PUBLICATIONS

The extended European search report issued by the European Patent Office dated Mar. 12, 2018, which corresponds to European Patent Application No. 17199382.7 and is related to U.S. Appl. No. 15/795,326.

(Continued)

*Primary Examiner* — Rodney B White
(74) *Attorney, Agent, or Firm* — Studebaker & Brackett PC

(57) ABSTRACT

The present disclosure relates to a footrest for a car seat, and more particularly, relates to a position adjusting device applied to a footrest for a car seat, including an adhering member adhered to an outer circumferential surface of the guide bar and a pressing member pressing the adhering member. The adhering member includes a first adhering plate adhered to the outer circumferential surface of the guide bar, a second adhering plate coupled to the first adhering plate, an elastic member disposed between the first (Continued)

adhering plate and the second adhering plate, and a contact member disposed between the first adhering plate and the second adhering plate to accommodate the elastic member. The contact member makes contact with the outer circumferential surface of the guide bar through a contact hole defined through the first adhering plate.

13 Claims, 15 Drawing Sheets

(56) References Cited

U.S. PATENT DOCUMENTS

| | | | |
|---|---|---|---|
| 6,523,895 B1* | 2/2003 | Vogtherr | A47C 1/024 |
| | | | 297/291 |
| 6,695,407 B1* | 2/2004 | Lin | A47C 1/02 |
| | | | 297/423.38 X |
| 6,957,867 B1* | 10/2005 | Su | A47C 1/03 |
| | | | 297/353 |
| 7,296,855 B1* | 11/2007 | Link | A47C 7/402 |
| | | | 297/353 X |
| 7,896,440 B2* | 3/2011 | Tsai | A47C 1/03 |
| | | | 297/353 |
| 7,980,519 B2* | 7/2011 | Chen | A47B 9/14 |
| | | | 297/338 X |
| 8,070,232 B2* | 12/2011 | Hung | A47C 7/405 |
| | | | 297/353 X |
| 8,341,776 B2* | 1/2013 | Galati, Jr. | A47K 3/022 |
| | | | 297/423.38 |
| 8,449,035 B2* | 5/2013 | Breitkreuz | A47C 7/42 |
| | | | 297/353 |
| 9,248,072 B2* | 2/2016 | Wu | A61H 3/04 |
| 2008/0093905 A1* | 4/2008 | Maier | A47C 7/448 |
| | | | 297/353 |
| 2015/0115683 A1 | 4/2015 | Huang | |
| 2015/0115685 A1 | 4/2015 | Lee | |
| 2015/0137575 A1* | 5/2015 | Millasseau | B60N 3/063 |
| | | | 297/423.38 |
| 2016/0166065 A1* | 6/2016 | Powicki | A47C 1/023 |
| | | | 297/353 |

FOREIGN PATENT DOCUMENTS

| | | |
|---|---|---|
| JP | 2003-94994 A | 4/2003 |
| JP | 2012-76717 A | 4/2012 |
| KR | 10-0331007 B1 | 5/1996 |
| KR | 10-1399896 B1 | 5/2014 |
| KR | 10-1664311 B1 | 10/2016 |
| WO | 02/04114 A1 | 5/2002 |

OTHER PUBLICATIONS

An Office Action; "Notification of Reasons for Refusal," issued by the Korean Intellectual Property Office dated Nov. 28, 2016, which corresponds to Korean Patent Application No. 10-2016-0144629 and is related to U.S. Appl. No. 15/795,326; with English Translation.

A Decision to Grant issued by the Korean Intellectual Property Office dated Jan. 16, 2017, which corresponds to Korean Patent Application No. 10-2016-0144629 and is related to U.S. Appl. No. 15/795,326; with English Translation.

* cited by examiner

POSITION ADJUSTING DEVICE OF FOOTREST FOR CAR SEAT

CROSS-REFERENCE TO RELATED APPLICATION

This U.S. non-provisional patent application claims priority under 35 U.S.C. § 119 of Korean Patent Application No. 10-2016-0144629, filed on Nov. 1, 2016, the contents of which are hereby incorporated by reference in its entirety.

BACKGROUND

1. Field of Disclosure

The present disclosure relates to a footrest for a car seat. More particularly, the present disclosure relates to a position adjusting device applied to a footrest for a car seat.

2. Description of the Related Art

In general, a seat of a vehicle is equipped with a seat belt to ensure a safety of the driver and the passengers, and for children over a certain height and weight and adults, wearing the seat belt prevents ejection during an accident. However, since the seat belt installed in the vehicle by default is made for adult use, the seat belt is not able to stably hold the main body of the children, such as a newborn baby, a toddler, or a child who are smaller than adults. Accordingly, the children are in danger of bouncing around or being ejected during a collision or a sudden stop, or the seat belt causes a secondary injury due to extreme pressure on the wearer's chest. In order to prevent these problems, a car seat (or a child seat) designed specifically to fit into a child's size is mounted on a vehicle seat, the child is seated on the car seat, and then a safety belt of the car seat is fastened to ensure the safety of the child.

However, the feet of the child who sits on the car seat do not touch the floor of the vehicle such that the feet are floating in the air. In this state, when the vehicle travels for a long period of time or travels frequently, the child feels uncomfortable, and the knee, ankle, etc., of the child are highly likely to be damaged.

In order to overcome these problems, Korean Patent No. 10-0331007 discloses a car seat with a footrest installed therein. However, in this Korean Patent, since the footrest is installed in the car seat, the car seat, which is currently in use, becomes useless and a purchase of a new car seat is required. In addition, the footrest is always in a fixed position, and the height and inclination of the footrest are not adjusted in accordance with the body type of a child. Accordingly, some children are seated on the car seat in uncomfortable ways, and the car seat is not suitable for all age groups of children.

SUMMARY

The present disclosure provides a footrest for a car seat, which is able to be easily installed on the car seat.

The present disclosure provides a position adjusting device allowing a user to easily adjust a height of each of a plurality of modules installed on the footrest for the car seat.

Embodiments of the inventive concept provide a position adjusting device, which adjusts a height of a module installed at a guide bar, including an adhering member adhered to an outer circumferential surface of the guide bar and a pressing member pressing the adhering member. The adhering member includes a first adhering plate adhered to the outer circumferential surface of the guide bar, a second adhering plate coupled to the first adhering plate, an elastic member disposed between the first adhering plate and the second adhering plate, and a contact member disposed between the first adhering plate and the second adhering plate and provided with one opened surface into which the elastic member is inserted. The contact member makes contact with the outer circumferential surface of the guide bar through a contact hole defined through the first adhering plate.

The first adhering plate includes a plurality of protrusions disposed on a surface thereof adhered to the outer circumferential surface of the guide bar.

The outer circumferential surface of the guide bar includes a plurality of grooves having a pattern corresponding to the protrusions.

The protrusions include a first protrusion, a second protrusion, and a third protrusion disposed adjacent to the second protrusion, and a distance between the first protrusion and the second protrusion is shorter than a distance between the second protrusion and the third protrusion.

The contact hole is defined between the second protrusion and the third protrusion.

The protrusions include a first protrusion, a second protrusion, and a third protrusion disposed adjacent to the second protrusion, the contact member makes contact with the outer circumferential surface of the guide bar through the contact hole defined between the second protrusion and the third protrusion, and a length of the contact member in a direction toward the guide bar is longer than a length of the first to third protrusions in the direction toward the guide bar.

In a case that a pressure is applied to the pressing member, the pressing member presses the second adhering plate, the second adhering plate presses the first adhering plate coupled to the second adhering plate, and the protrusions disposed on the outer circumferential surface of the guide bar are adhered and fixed to the grooves defined in the outer circumferential surface of the guide bar.

In a case that the pressure applied to the pressing member is removed, the elastic member presses the second adhering plate to a direction opposite to the direction toward the guide bar, and the protrusions disposed on the first adhering plate coupled to the second adhering plate are separated from the grooves defined in the outer circumferential surface of the guide bar by the contact member.

At least one corner among corners of the surface of the contact member, which makes contact with the guide bar, has a length longer than a length of a corner of a corresponding groove among the grooves defined in the outer circumferential surface of the guide bar.

A surface of the contact member, which makes contact with the outer circumferential surface of the guide bar, has a shape different from the grooves defined in the outer circumferential surface of the guide bar.

The elastic member is a spring.

The module is at least one of an adaptor, a support plate, a guide bar including a sub-guide bar required to extend a length of the guide bar, and a seat for children of a stroller.

According to the above, the position adjusting device according to embodiments of the present disclosure may easily adjust the height of the module installed at the guide bar without being stuck and securely and fixedly couple the module to the guide bar.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Hereinafter, the technological thought of the present disclosure will be described with reference to accompanying drawings in order to explain in sufficient detail such that the technological thought of the present disclosure is easily carried out by an ordinary skilled person in the art within the spirit and scope of the present disclosure.

Figure 1:
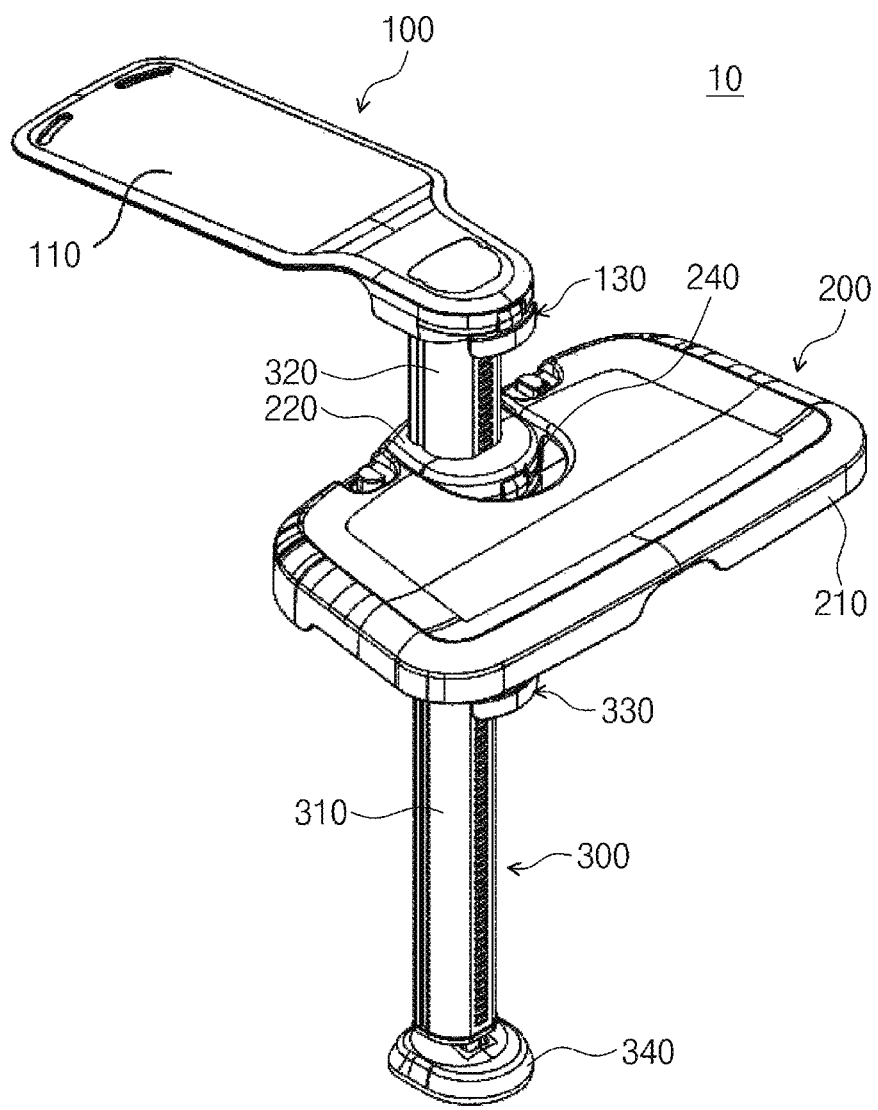
FIG. 1 is a perspective view showing a footrest for a car seat, which has a position adjusting device according to an exemplary embodiment of the present disclosure.

FIG. 1 is a perspective view showing a footrest 10 for a car seat (hereinafter, referred to as a "car seat footrest"), which has position adjusting devices 130, 240, and 330 according to an exemplary embodiment of the present disclosure.

The position adjusting devices 130, 240, and 330 separate an adhering member from a guide bar 300 when a pressure is removed, and thus the position adjacent devices 130, 240, and 330 may be prevented from being unintentionally stuck. The position adjusting devices 130, 240, and 330 tightly secure the adhering member to a groove of an outer circumferential surface of the guide bar 300 when the pressure is applied.

Referring to FIG. 1, the car seat footrest 10 includes a coupling plate 100, a support plate 200, and a guide bar 300.

The coupling plate 100 has a plate shape and is coupled between a vehicle seat and a car seat coupled to the vehicle seat, and at least one coupling hole H (refer to FIG. 6) may be formed in a surface of the coupling plate 100 having the plate shape. That is, in a case that the car seat is installed on the vehicle seat, it is common that the car seat is put on and fixed to the vehicle seat by fastening the car seat to the vehicle seat with a vehicle's seat belt. As described above, in the case that the car seat is put on the vehicle seat, the coupling plate 100 may be placed and fixed between the vehicle seat and the car seat. That is, when the car seat is fastened and fixed by the vehicle's seat belt after the coupling plate 100 is put on the vehicle seat and the car seat is put on the coupling plate 100, a pressure applying to the vehicle seat by the car seat is transmitted to the coupling plate 100, and thus the support plate 200 may be fixed. The coupling plate 100 should not be limited to the shape of FIG. 1. That is, the coupling plate 100 may have various shapes and include various materials as long as the coupling plate 100 is coupled and fixed between the car seat and the vehicle seat.

The coupling plate 100 may include a coupling member 110 placed between the car seat and the vehicle seat, the coupling hole H (refer to FIG. 6), which is formed in a thru-hole and into which the guide bar 300 is inserted, and a first position adjusting device 130 that fixes the coupling plate 100 to the guide bar 300.

The first position adjusting device 130 fixes a coupling position of the coupling plate 100 inserted into the guide bar 300. That is, the first position adjusting device 130 is installed at one side of the coupling member 110 to allow the coupling member 110 to be fixed at a certain position of the guide bar 300.

The support plate 200 may support the feet of a child who sits in the car seat and may be implemented in various shapes and by various materials. The support plate 200 may include a support member 210 having a plate shape to support the child's feet, a fixing member 220 coupled to the guide bar 300, an angle adjusting device coupling the support member 210 in an axis direction of the fixing member 220 such that the support member 210 is rotatable, and a second position adjusting device 240 fixing the support plate 200 to the guide bar 300.

The second position adjusting device 240 allows the support plate 200 to be fixed to the coupling position at which the support plate 200 is coupled to the guide bar 300. That is, the second position adjusting device 240 is installed at one side of the fixing member 220 to fix the fixing member 220 to a certain position of the guide bar 300.

The guide bar 300 is supported by a floor surface of a vehicle and has a pillar shape. For example, a cross-sectional shape of the guide bar 300 may be circular shape. However, the cross-sectional shape of the guide bar 300 should not be limited thereto. For example, the cross-sectional shape of the guide bar may be rectangular shape. The coupling plate 100 and the support plate 200 are installed at the guide bar 300, and positions of the adaptor 100 and the support plate 200 on the guide bar 300 are changed.

The guide bar 300 includes a first guide bar 310 and a second guide bar 320 coupled to an outer circumferential surface of the first guide bar 310 and has a structure in which the first guide bar 310 and the second guide bar 320 overlap with each other to increase or decrease a length of the guide bar 300 by the first and second guide bars 310 and 320.

A plurality of grooves may be defined on one side of an outer circumferential surface of the guide bar 300 in a portion making contact with the first or second position adjusting device 130 or 240, and the grooves are arranged in one line. This is to increase a fixing force of the first position adjusting device 130 and the second position adjusting device 240 with respect to the guide bar 300 when the first position adjusting device 130 and the second position adjusting device 240 are fixed to the guide bar 300.

In addition, the guide bar 300 may include a third position adjusting device 330 to fix the increased or decreased length of the guide bar 300, which is adjusted by the first and second guide bars 310 and 320.

In the embodiment according to the present disclosure, at least one of the first, second, and third position adjusting devices 130, 240, and 330 separates the adhering member from the guide bar 300 when the pressure is removed, and thus the first, second, and third position adjusting devices 130, 240, and 330 may be prevented from being unintentionally stuck. In addition, at least one of the first, second, and third position adjusting devices 130, 240, and 330 tightly secure the adhering member to the groove of the outer circumferential surface of the guide bar 300 when the pressure is applied. This will be described in detail with reference to FIGS. 2 to 7.

Figure 2:
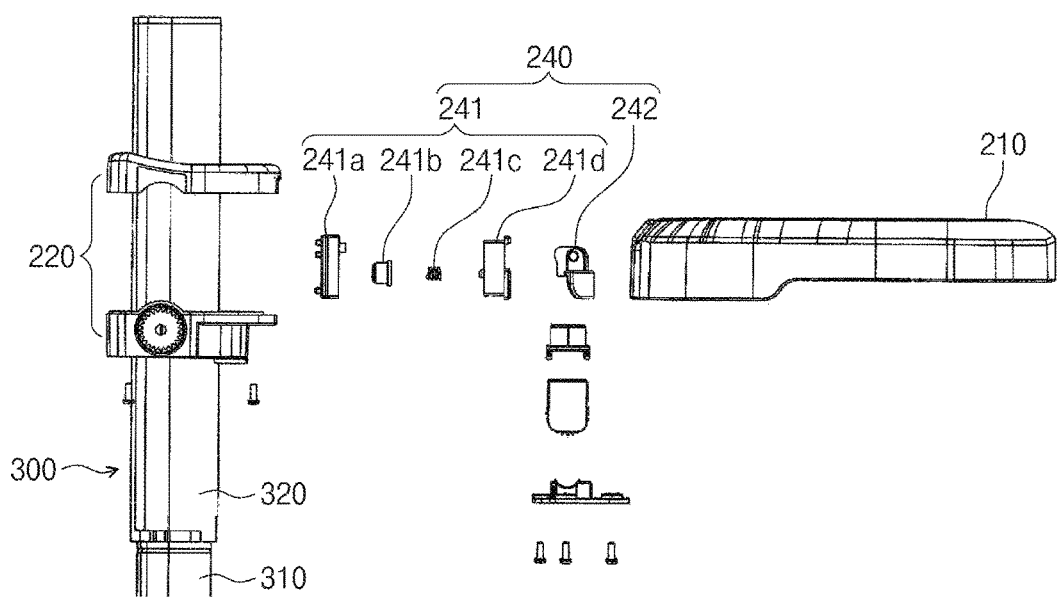
FIGS. 2 to 4 are side and perspective views showing in more detail a second position adjusting device provided in the footrest for the car seat shown in FIG. 1.
Figure 3:
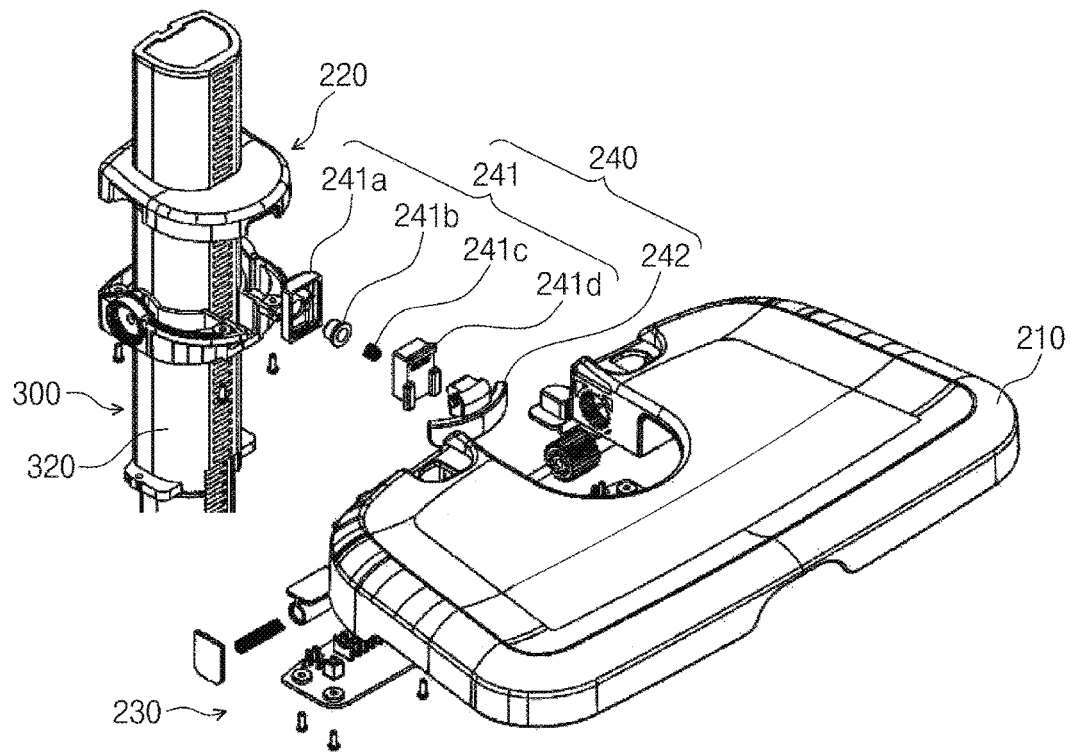
Figure 4:
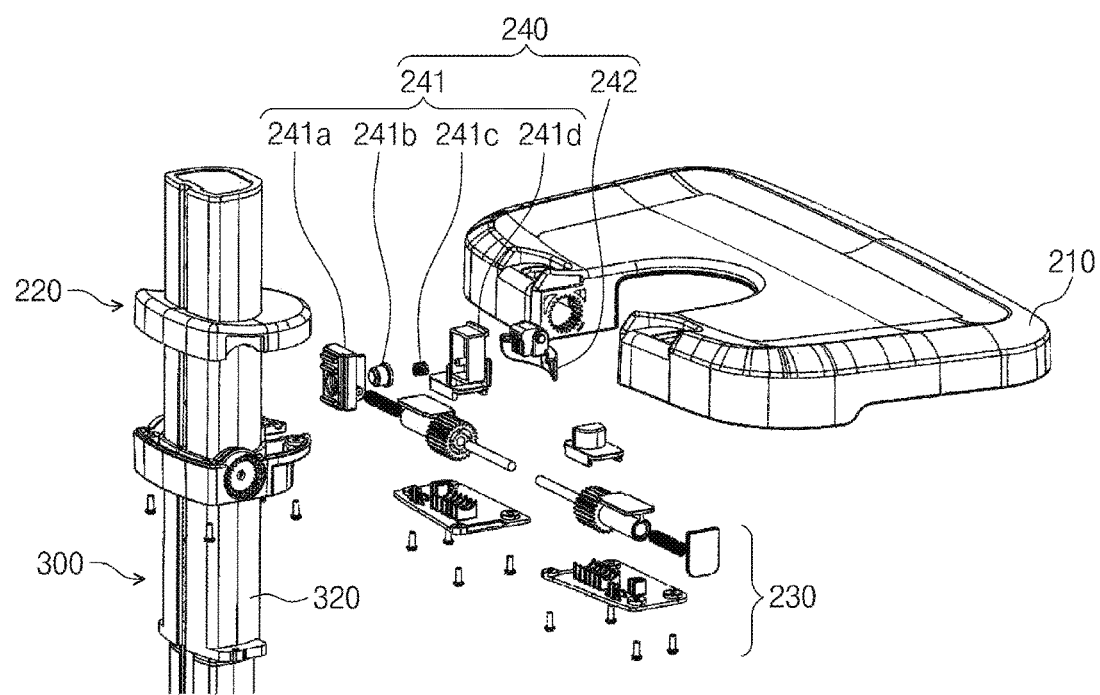

FIGS. 2 to 4 are side and perspective views showing in more detail the second position adjusting device 240 provided in the car seat footrest 10 in FIG. 1.

Referring to FIGS. 2 to 4, the second position adjusting device 240 includes an adhering member 241 and a pressing member 242, and the adhering member 241 includes a first adhering plate 241a, a contact member 241b, and an elastic member 241c, and a second adhering plate 241d.

The first adhering plate 241a makes contact with the outer circumferential surface of the guide bar 300 when a user applies a pressure thereto by using the pressing member 242, and a protrusion protruded from a portion of the contact surface is provided on one surface of the first adhering plate 241a, which makes contact with the guide bar 300.

The protrusion of the first adhering plate 241a and the groove in the outer circumferential surface of the guide bar 300 may have shapes corresponding to each other such that the protrusion and the groove are adhered and fixed to each other. For instance, as shown in FIGS. 2 to 4, three protrusions, each having a rectangular shape, may be provided on the first adhering plate 241a, and the three protrusions may respectively correspond to grooves, each having a rectangular shape, defined in the outer circumferential surface of the guide bar 300, but they should not be limited thereto or thereby. That is, the number and shape of the protrusions provided on the first adhering plate 241a may be changed in various ways.

The first adhering plate 241a may be provided with a contact hole defined therethrough to pass the contact member 241b. For instance, as shown in FIGS. 2 to 4, the contact hole may be defined between the three protrusions provided on the first adhering plate 241a, two protrusions may be disposed at an upper side of the contact hole, and one protrusion may be disposed at a lower side of the contact hole, but they should not be limited thereto or thereby. That is, the position and size of the contact hole may be changed in various ways.

The contact member 241b is disposed between the first adhering plate 241a and the second adhering plate 241d and has a shape of which one surface is opened. Thus, the elastic member 241c may be inserted into the contact member 241b. The contact member 241b may make contact with the outer circumferential surface of the guide bar 300 through the contact hole of the first adhering plate 241a.

For instance, a length of the contact member 241b in a direction toward the guide bar 300 is longer than a length of the three protrusions provided on the first adhering plate 241a in the direction toward the guide bar 300 such that the first adhering plate 241a is separated from the guide bar 300 when the pressure provided through the pressing member 242 is removed.

As another example, in order to prevent the contact member 241b from being coupled to the groove of the outer circumferential surface of the guide bar 300, the contact member 241b may have different shape and/or size from those of the groove of the outer circumferential surface of the guide bar 300. For instance, as shown in FIGS. 2 to 4, in a case that the groove of the guide bar 300 has a quadrangular shape, the contact member 241b may have a cylindrical shape greater than the groove.

However, according to another embodiment, the shape and size of the contact member 241b may be changed in various ways. For instance, the contact member 241b may have the same shape as that of the groove of the outer circumferential surface of the guide bar 300, and in this case, the length of the contact member 241b may be longer than that of at least one of the protrusions provided on the first adhering plate 241a. As another example, a length of at least one corner of the surface of the contact member 241b, which makes contact with the guide bar 300, may be longer than a length of a corner of the groove of the guide bar 300, which corresponds to the corner of the surface of the contact member 241b.

The elastic member 241c is disposed between the first adhering plate 241a and the second adhering plate 241d and inserted into the opened portion of the contact member 241b. The elastic member 241c is maintained in a compressed state when the user applies the pressure to the pressing member 242 and returns to its original state by a restoring force thereof when the pressure applied to the pressing member 242 is removed. The elastic member 241c may be implemented, for example, by using a spring.

The second adhering plate 241d is fixedly coupled to the first adhering plate 241a. That is, the second adhering plate 241d and the first adhering plate 241a are fixedly coupled to each other while the contact member 241b and the elastic member 241c are inserted into between the second adhering plate 241d and the first adhering plate 241a.

To this end, one surface of the second adhering plate 241d may have a shape corresponding to one surface of the first adhering plate 241a. For instance, as shown in FIGS. 2 and 3, the one surface of the second adhering plate 241d and the one surface of the first adhering plate 241a may have the same rectangular shape and the same size and may be securely and fixedly coupled to each other by a screw.

Meanwhile, the adhering member 241 including the first adhering plate 241a, the contact member 241b, the elastic member 241c, and the second adhering plate 241d is inserted into one side of the fixing member 220 and coupled to the guide bar 300.

Hereinafter, an operation of the second position adjusting device 240 according to the exemplary embodiment will be described in detail. In the case that the user pressurizes a curved surface portion of the pressing member 242 when the pressing member 242 is axially coupled to the fixing member 220, the pressing member 242 makes contact with the second adhering plate 241d to pressurize the second adhering plate 241d, and the second adhering plate 241d pressurizes the first adhering plate 241a. Accordingly, the first adhering plate 241a makes contact with and is fixed to the outer circumferential surface of the guide bar 300. As a result, the support plate 200 interlocked with the fixing member 220 may be fixed to the certain position of the guide bar 300. In this case, since the pressure applied by the user is greater than the restoring force of the elastic member 241c, the elastic member 241c is maintained in the compressed state by the second adhering plate 241d.

In the case that the pressure applied to the pressing member 242 is removed by the user, the elastic member 241c returns to its original state by the restoring force. In this case, the elastic member 241c applies the pressure to the contact member 241b in a direction toward the guide bar 300. In addition, since the elastic member 241c applies the pressure to the second adhering plate 241d in an opposite direction of the guide bar 300 by the restoring force and the second adhering plate 241d is fixedly coupled to the first adhering plate 241a, the first adhering plate 241a is separated from the guide bar 300 by the contact member 241b.

Consequently, when the pressure applied to the pressing member 242 is removed, the first adhering plate 241a is separated from the guide bar 300 by a predetermined distance, and thus the user may stably adjust the position of the support plate 200 without being stuck.

Further, the groove of the outer circumferential surface of the guide bar 300 may have a deeper depth by the distance between the first adhering plate 241*a* and the guide bar 300, and thus the guide bar 300 and the adhering member 241 may be more securely fixed to each other.

Meanwhile, the technological thought of the present disclosure should not be limited thereto or thereby. For instance, the configuration and operation of the second position adjusting device 240 described with reference to FIGS. 2 to 4 may be applied to the first position adjusting device 130 and/or the third position adjusting device 330.

Figure 5:
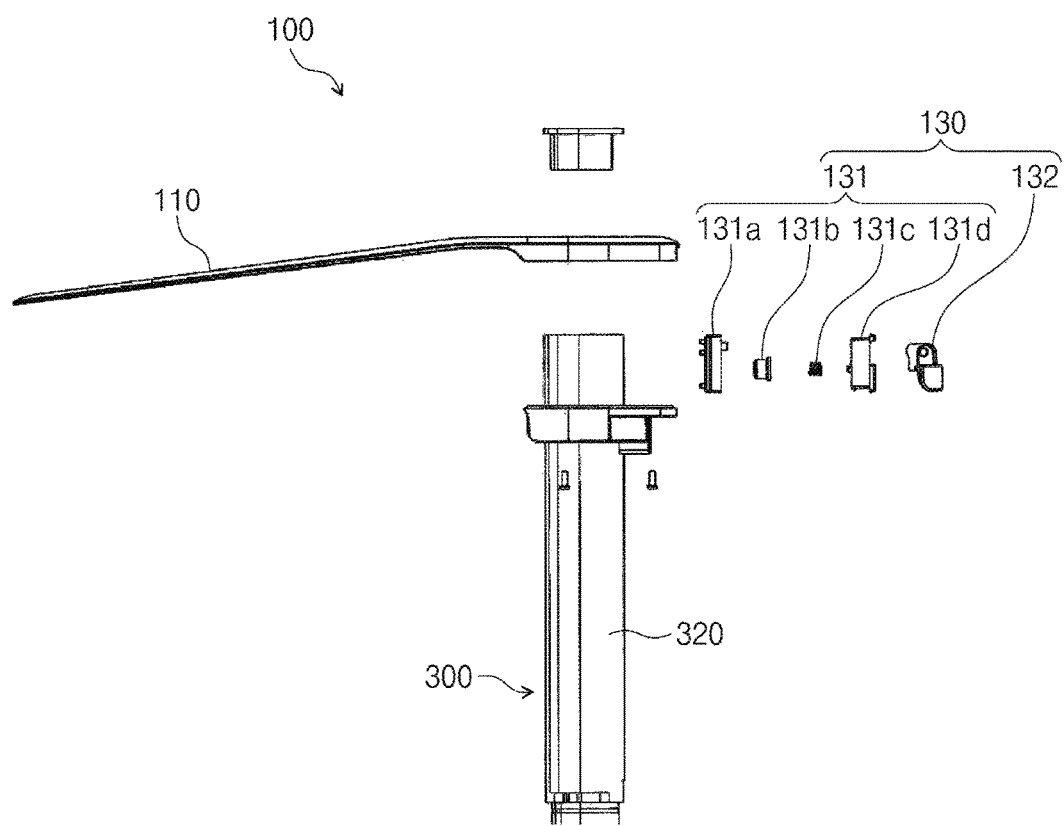
FIGS. 5 to 7 are side and perspective views showing in more detail a first position adjusting device provided in the footrest for the car seat shown in FIG. 1.
Figure 6:
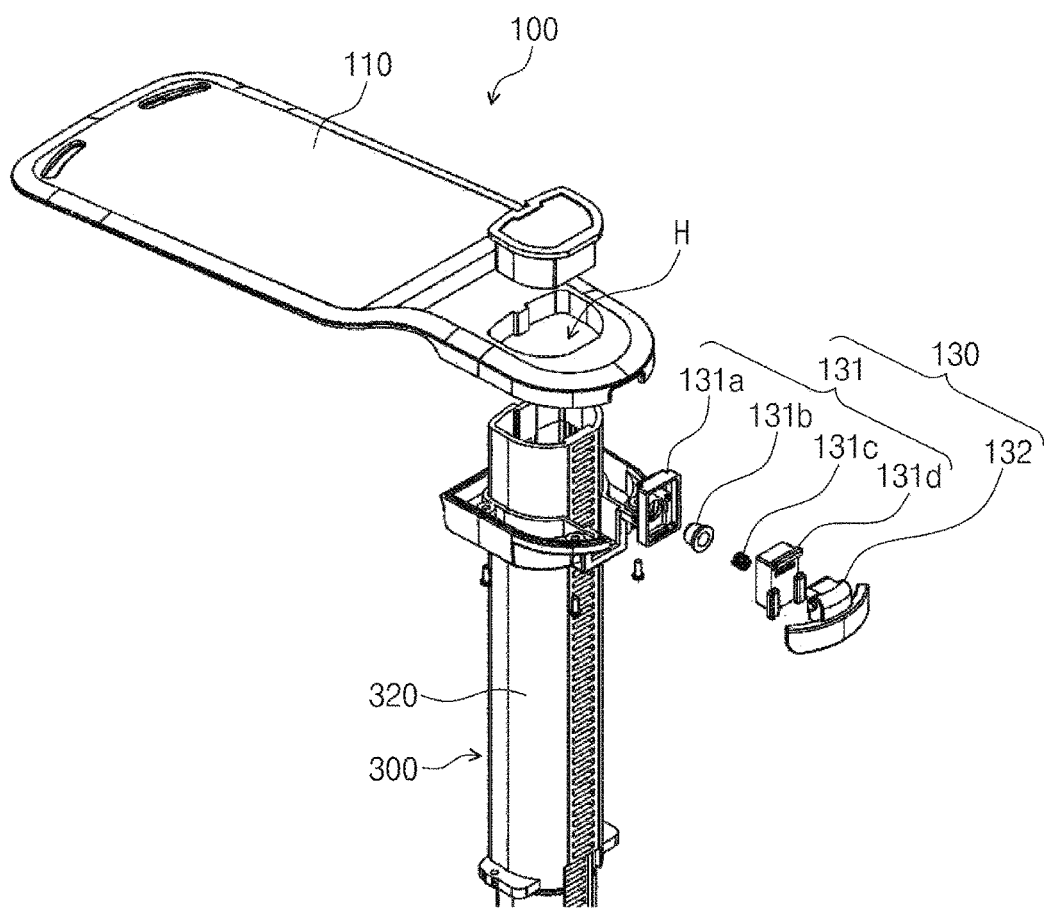
Figure 7:
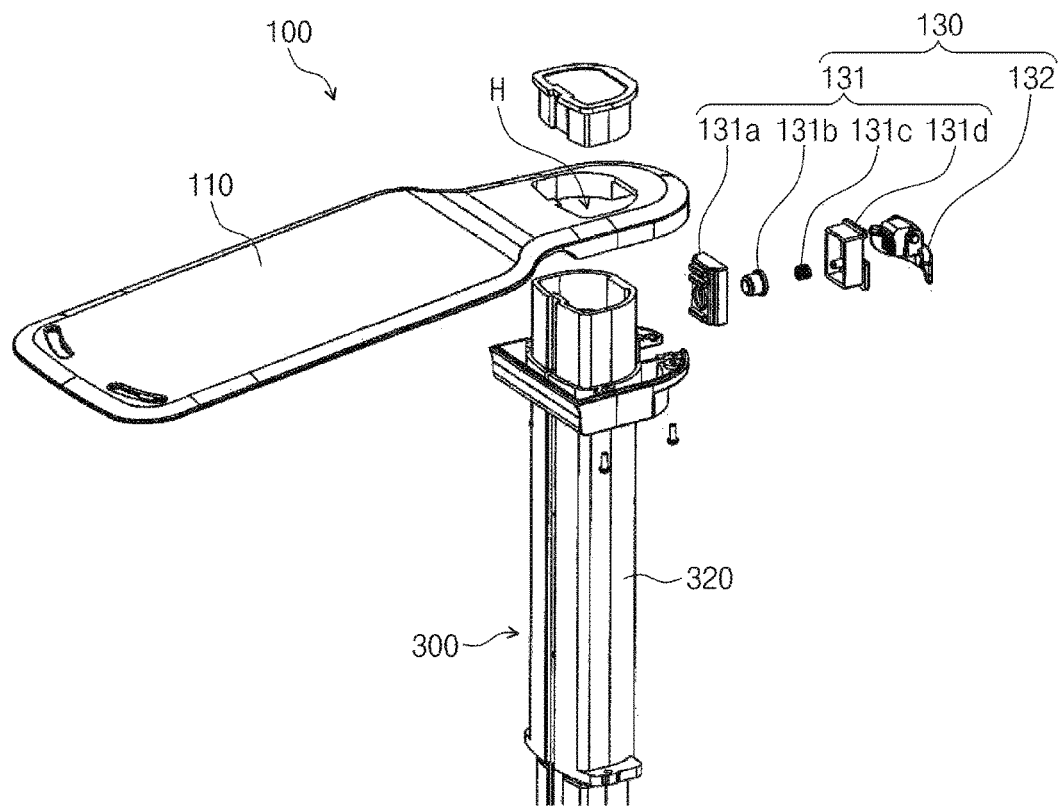

For instance, as shown in FIGS. 5 to 7, the first position adjusting device 130 may be implemented with the same structure as the second position adjusting device 240 described with reference to FIGS. 2 and 3. That is, the first position adjusting device 130 includes an adhering member 131 and a pressing member 132, and the adhering member 131 may be implemented to include a first adhering plate 131*a*, a contact member 131*b*, an elastic member 131*c*, and a second adhering plate 131*d*.

Figure 8:
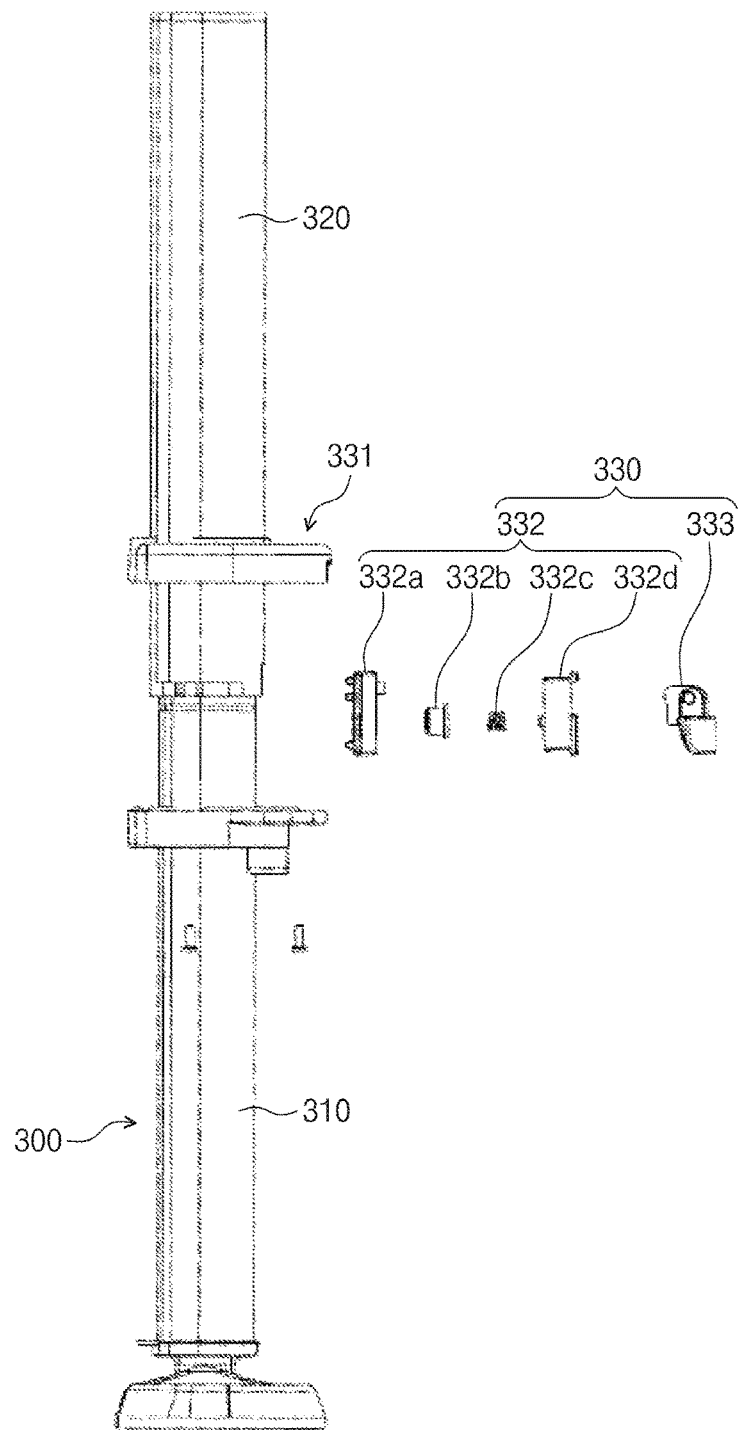
FIGS. 8 to 10 are side and perspective views showing in more detail a third position adjusting device provided in the footrest for the car seat shown in FIG. 1.
Figure 9:
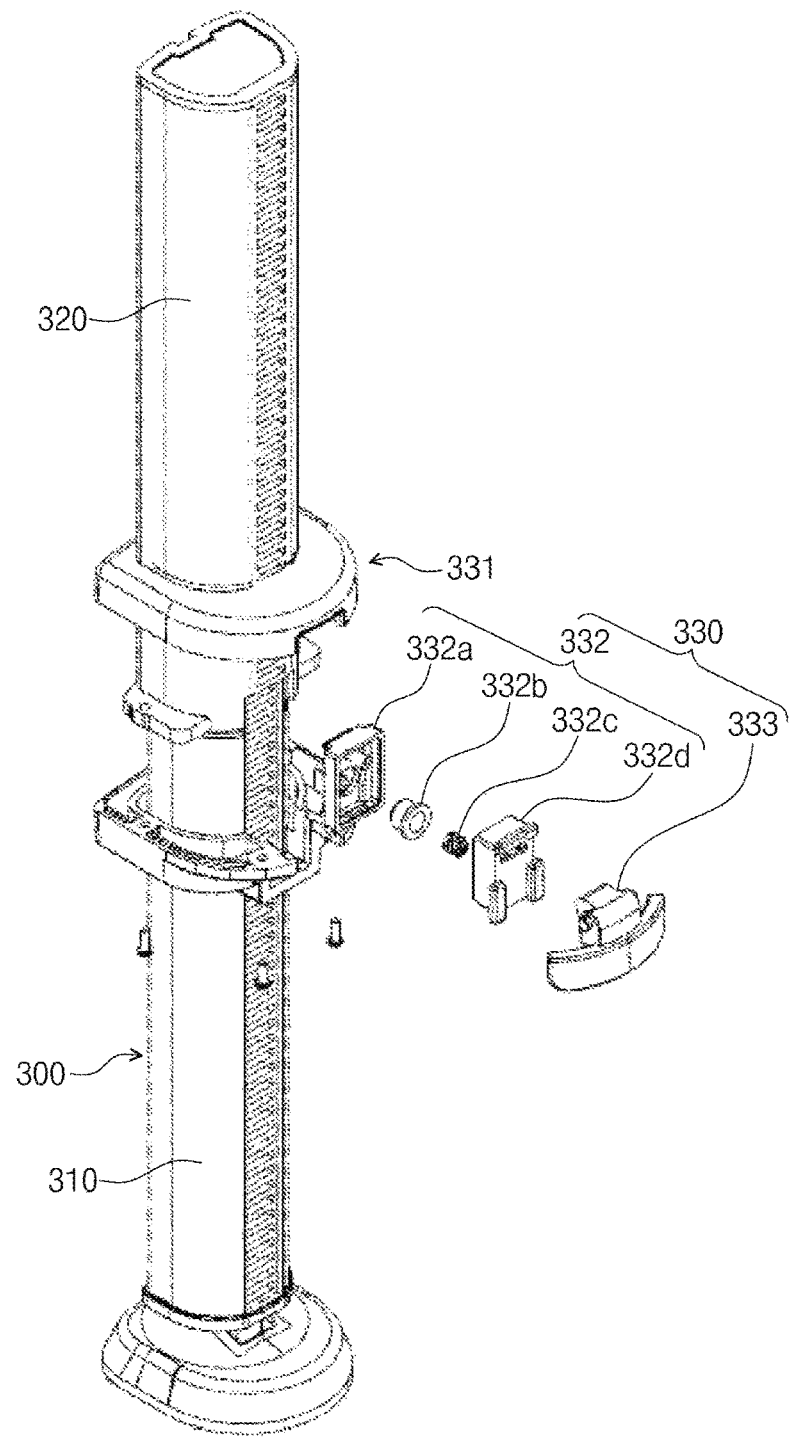
Figure 10:
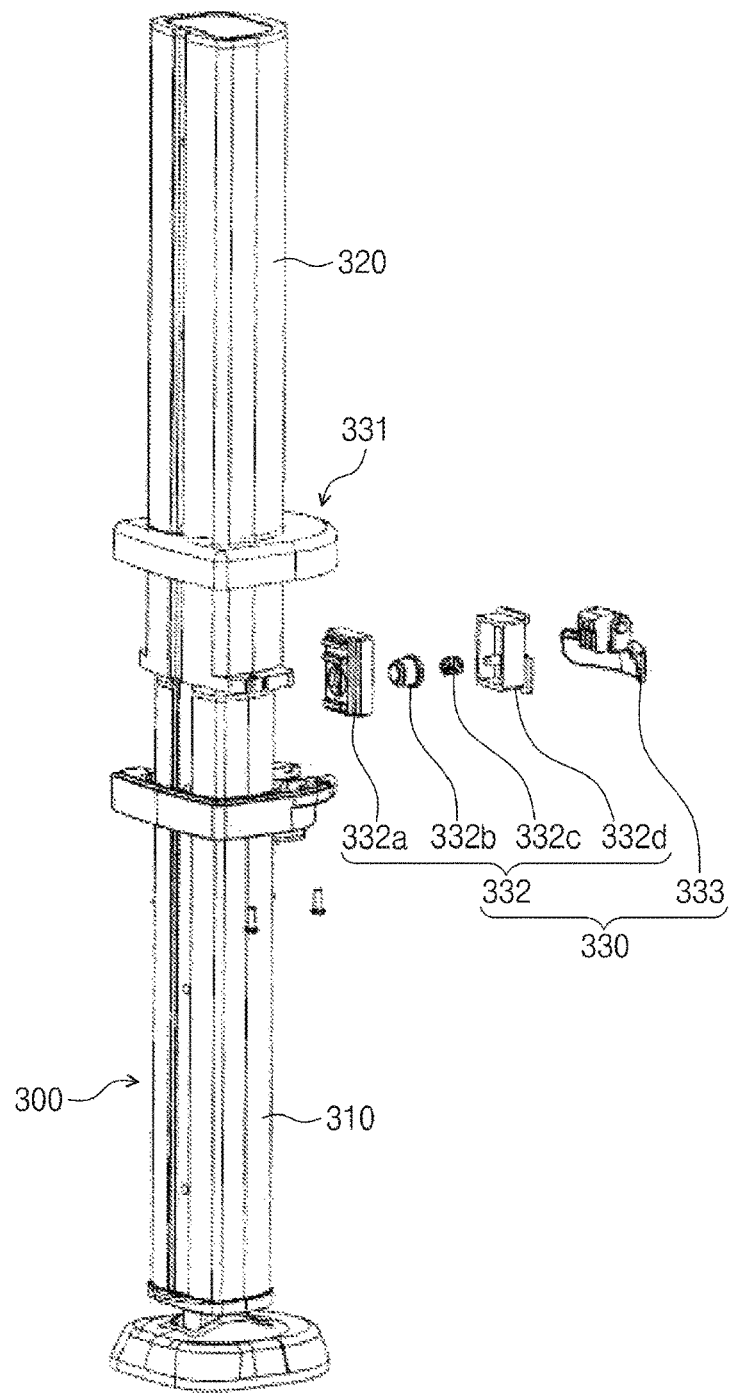

As another example, as shown in FIGS. 8 to 10, the third position adjusting device 330 may be implemented with the same structure as the second position adjusting device 240 described with reference to FIGS. 2 and 3.

That is, the third position adjusting device 330 includes an adhering member 332 and a pressing member 333, and the adhering member 332 may be implemented to include a first adhering plate 332*a*, a contact member 332*b*, an elastic member 332*c*, and a second adhering plate 332*d*.

As another example, the third position adjusting device 330 may be implemented to further include a body 331, which is disposed at a lower end of the second guide bar 320, in addition to the adhering member 332 and the pressing member 333.

Meanwhile, the above-mentioned description is an exemplary embodiment of the position adjusting device, and it is understood that the present disclosure should not be limited thereto or thereby. As an example, FIGS. 1 to 10 show the car seat footrest including the coupling plate 100 placed between the vehicle seat and the car seat, but the position adjusting device according to the present disclosure may be applied to a car seat provided with a coupling part and an insert part inserted into and engaged with the coupling part. As another example, the position adjusting device according to the present disclosure may be applied to a stroller in addition to the car seat footrest. Hereinafter, applications of the position adjusting device according to the present disclosure will be described in detail.

Figure 13:
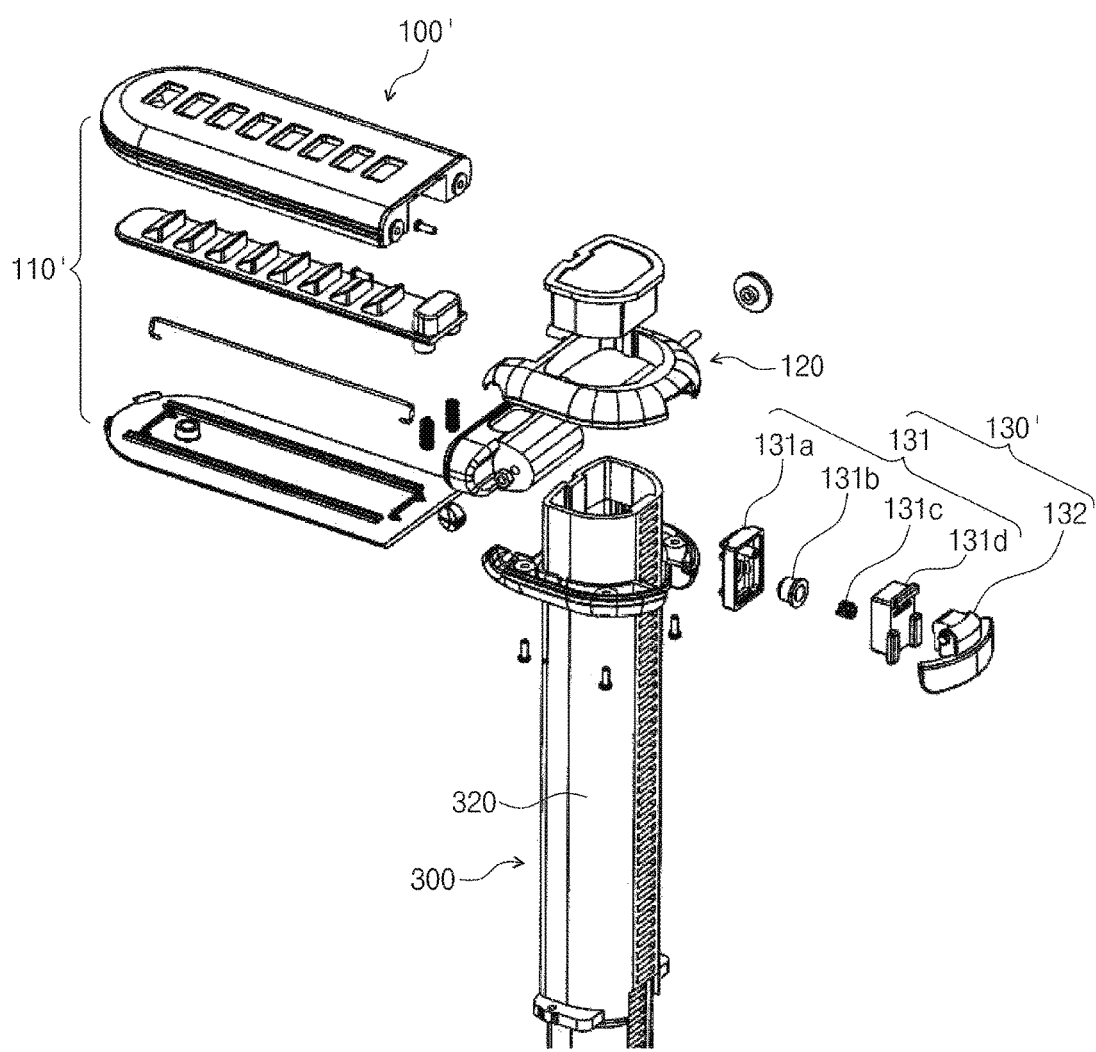
Figure 14:
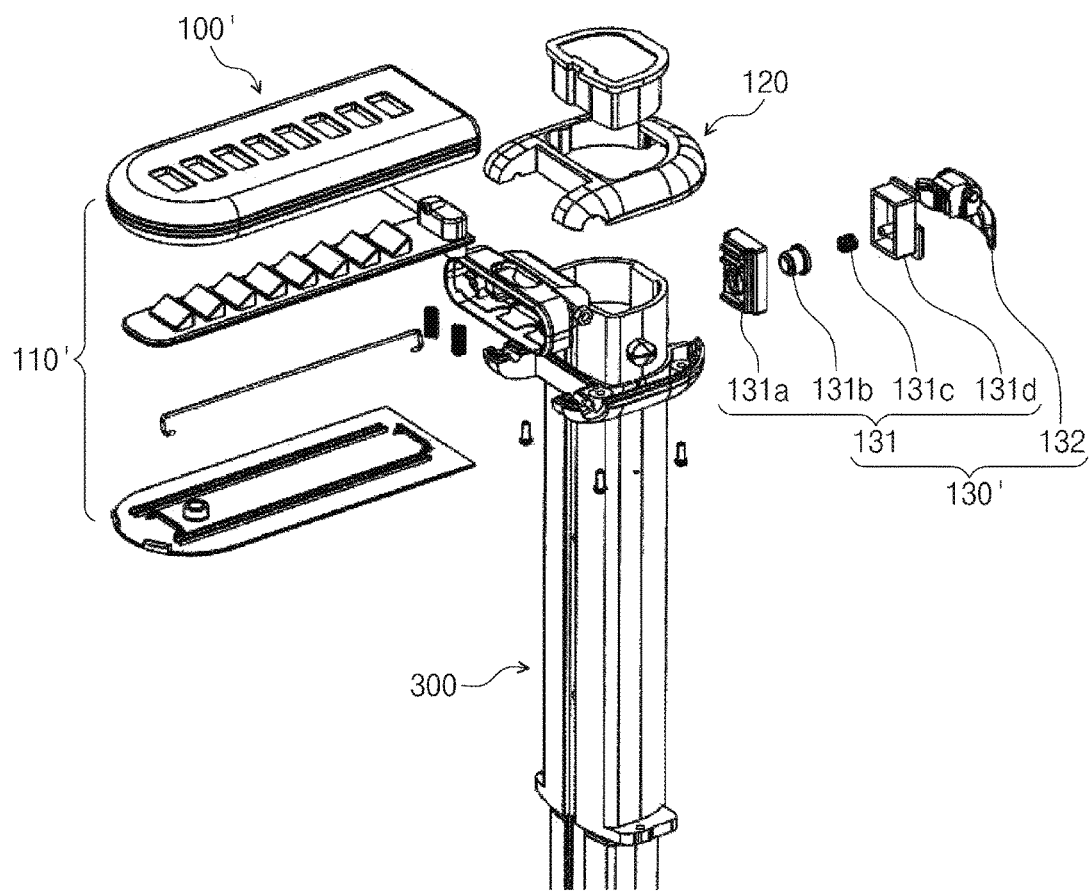
Figure 15:
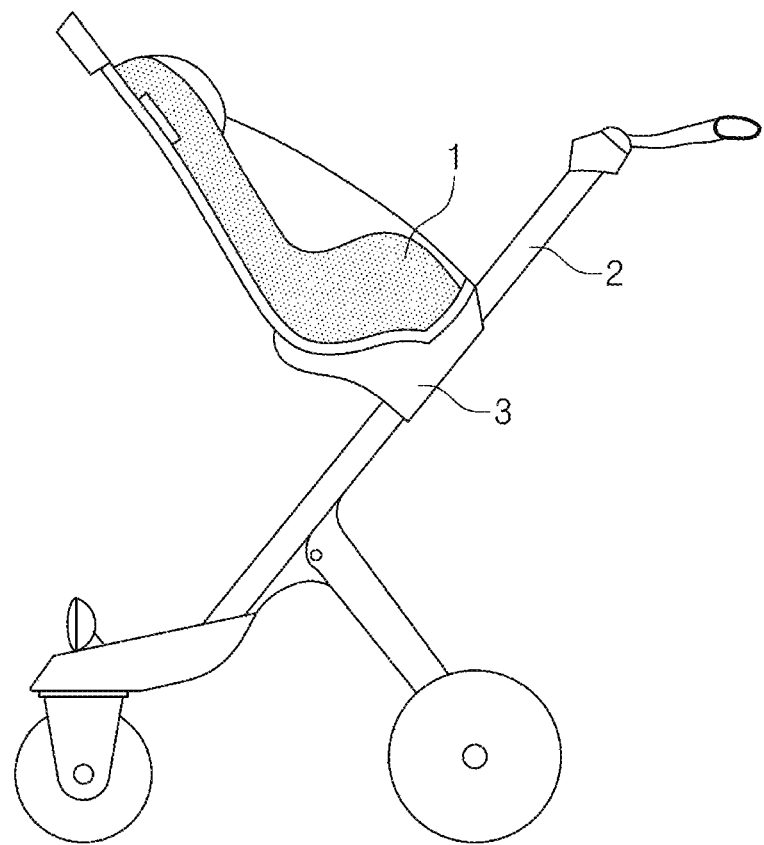
FIG. 15 is a view showing a stroller to which a position adjusting device is applied according to an exemplary embodiment of the present disclosure.

FIGS. 11 to 15 are views showing products to which the position adjusting device is applied according to exemplary embodiments of the present disclosure, FIGS. 11 to 14 are views showing a car seat footrest to which the position adjusting device is applied according to an exemplary embodiment of the present disclosure, and FIG. 15 is a view showing a stroller to which the position adjusting device is applied according to an exemplary embodiment of the present disclosure.

Figure 11:
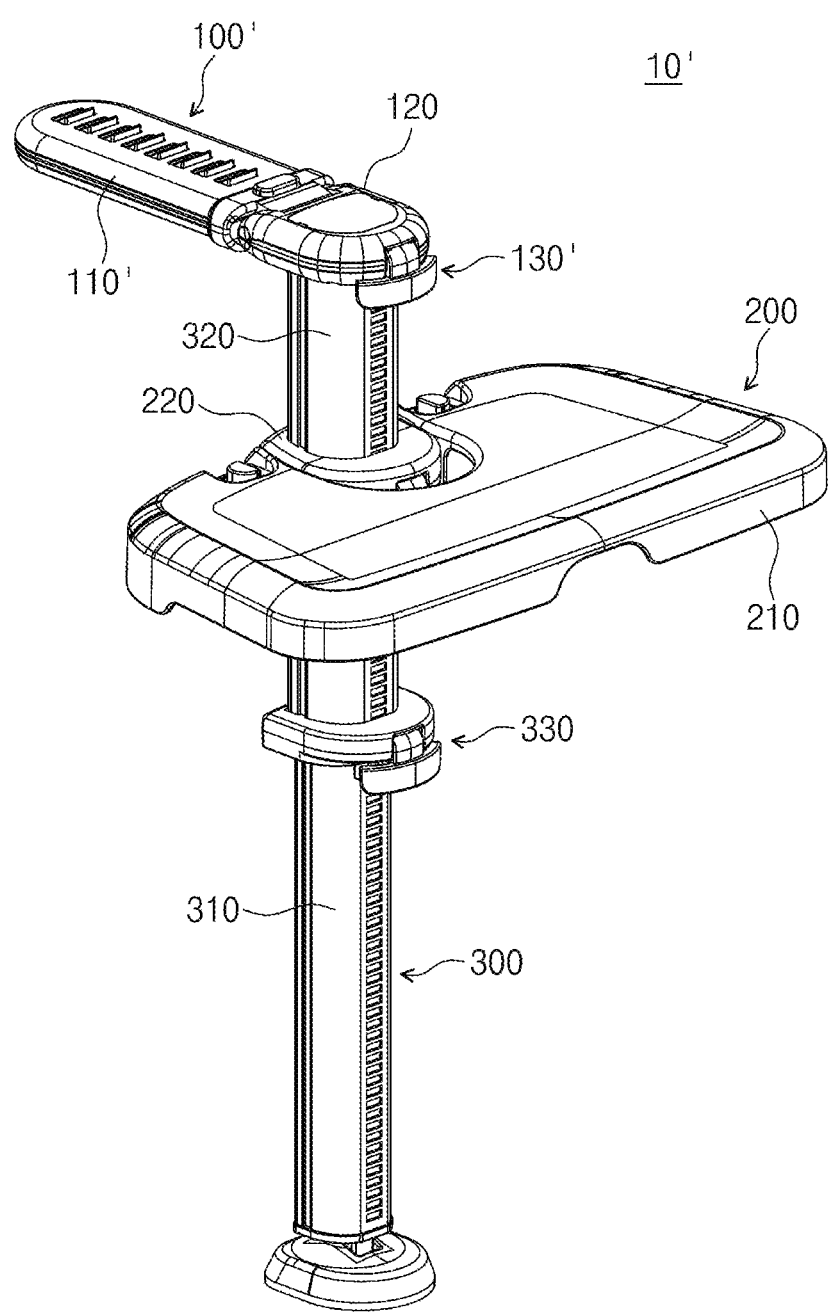
FIGS. 11 to 14 are perspective views showing a footrest for a car seat, to which a position adjusting device is applied, according to another embodiment of the present disclosure.

Referring to FIG. 11, an adaptor 100' may be coupled to the guide bar 300 instead of the coupling plate 100. In this case, the adaptor 100' includes an insert part 110' in which one side thereof is inserted into a coupling portion provided in a car seat (e.g., a default seat or a baby car seat). For instance, the car seat may be provided with a space defined therein, into which the insert part 110' is inserted and coupled, or the coupling portion as a coupling member. In this case, since the insert part 110' of the adaptor 100' is inserted into and coupled to the coupling portion provided in the car seat, the car seat footrest 10' may be fastened to the car seat. The insert part 110', which is inserted into the coupling portion, is provided at one side of the adaptor 100', and a rotational part 120, which is rotatable, is provided at the other side of the adaptor 100'. A first position adjusting device 130' is installed on one side of the rotational part 120.

The first position adjusting device 130' fixes a coupling position of the adaptor 100' inserted into the guide bar 300. The first position adjusting device 130' is installed at an opposite position to an axis connection portion of the rotational part 120 to allow the rotational part 120 to be fixed at a certain position of the guide bar 300.

Figure 12:
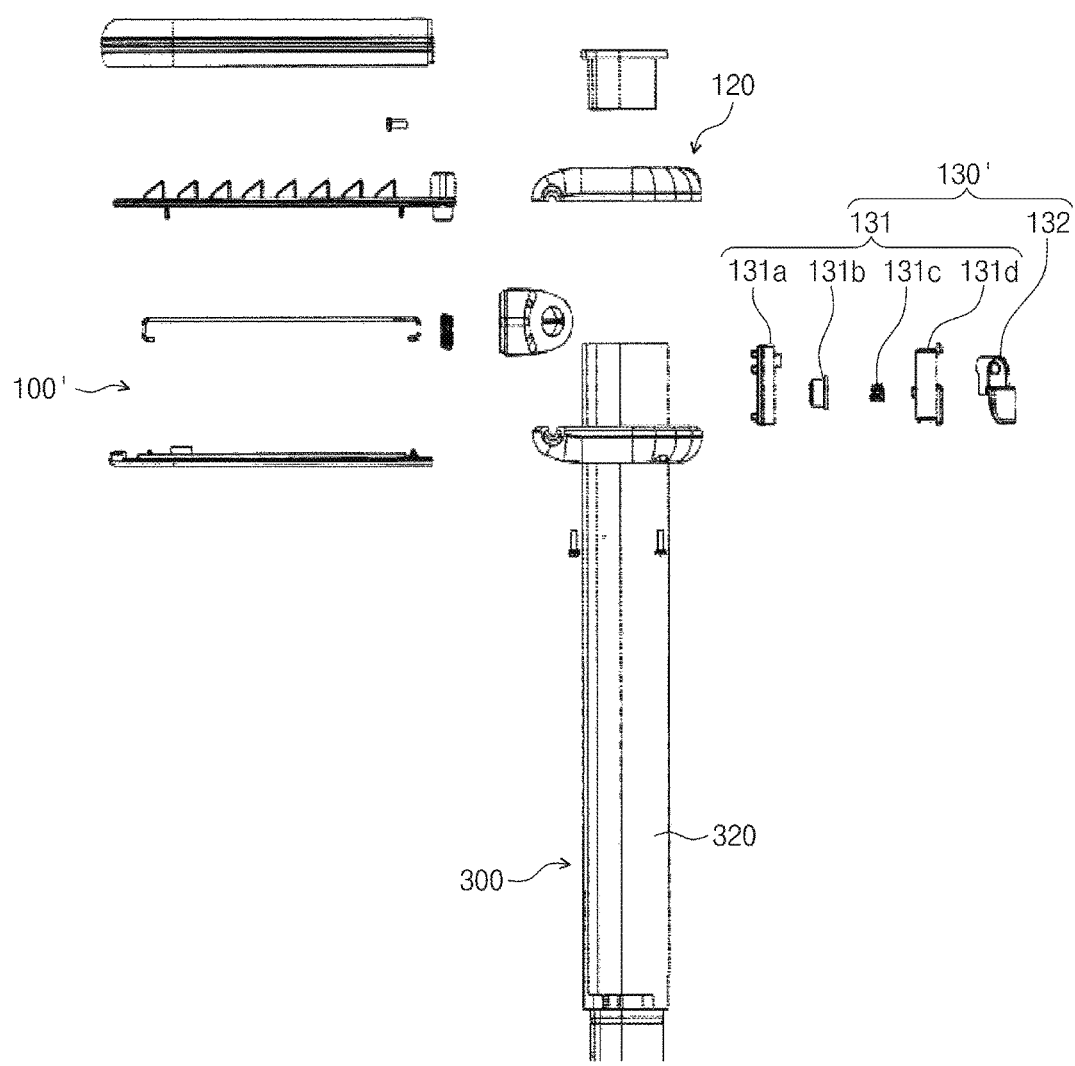

As shown in FIGS. 12 to 14, the first position adjusting device 130' may include an adhering member 131 and a pressing member 132, and the adhering member 131 may include a first adhering plate 131*a*, a contact member 131*b*, and an elastic member 131*c*, and a second adhering plate 131*d*.

Referring to FIG. 15, a stroller 20 includes a seat-for-children 1 and an axis 2 coupled to the seat-for-children 1, and the seat-for-children 1 and the axis 2 are fixedly coupled to each other by a position adjusting device 3. In this case, the position adjusting device 3 may have the same configuration as that of the position adjusting devices described with reference to FIGS. 2 to 10.

As described above, optimal embodiments have been disclosed in the drawings and the specification. Although specific terms have been used herein, these are only intended to describe the present embodiments and are not intended to limit the meanings of the terms or to restrict the scope of the accompanying claims. Accordingly, those skilled in the art will appreciate that various modifications and other equivalent embodiments are possible from the above embodiments. Therefore, the scope of the claims should be defined by the technical spirit of the specification.

What is claimed is:

1. A position adjusting device for adjusting a height of a module installed at a guide bar, the position adjusting device comprising:
   an adhering member adhered to an outer circumferential surface of the guide bar; and
   a pressing member pressing the adhering member, the adhering member comprising:
      a first adhering plate adhered to the outer circumferential surface of the guide bar;
      a second adhering plate coupled to the first adhering plate;
      an elastic member disposed between the first adhering plate and the second adhering plate; and
      a contact member disposed between the first adhering plate and the second adhering plate and provided with one opened surface into which the elastic member is inserted, wherein the contact member makes contact with the outer circumferential surface of the guide bar through a contact hole defined through the first adhering plate,
   wherein the first adhering plate comprises a plurality of protrusions disposed on a surface thereof adhered to the outer circumferential surface of the guide bar.

2. The position adjusting device of claim 1, wherein the outer circumferential surface of the guide bar comprises a plurality of grooves having a pattern corresponding to the protrusions.

3. The position adjusting device of claim 2, wherein, when a pressure is applied to the pressing member, the pressing member presses the second adhering plate, the second adhering plate presses the first adhering plate coupled to the second adhering plate, and the protrusions disposed on the outer circumferential surface of the guide bar are adhered and fixed to the grooves defined in the outer circumferential surface of the guide bar.

4. The position adjusting device of claim 3, wherein, when the pressure applied to the pressing member is removed, the elastic member presses the second adhering plate to a direction opposite to the direction toward the guide bar, and the protrusions disposed on the first adhering plate coupled to the second adhering plate are separated from the grooves defined in the outer circumferential surface of the guide bar by the contact member.

5. The position adjusting device of claim 2, wherein at least one corner among corners of the surface of the contact member, which makes contact with the guide bar, has a length longer than a length of a corner of a corresponding groove among the grooves defined in the outer circumferential surface of the guide bar.

6. The position adjusting device of claim 5, wherein a surface of the contact member, which makes contact with the outer circumferential surface of the guide bar, has a shape different from the grooves defined in the outer circumferential surface of the guide bar.

7. The position adjusting device of claim 2, wherein a surface of the contact member, which makes contact with the outer circumferential surface of the guide bar, has a shape different from the grooves defined in the outer circumferential surface of the guide bar.

8. The position adjusting device of claim 7, wherein, when a pressure applied to the pressing member is removed, the first adhering plate is separated from the outer circumferential surface of the guide bar by the contact member, which makes contact with the outer circumferential surface of the guide bar, to adjust the height of the module installed at the guide bar.

9. The position adjusting device of claim 2, wherein the protrusions comprise:
   a first protrusion;
   a second protrusion; and
   a third protrusion disposed adjacent to the second protrusion, and a distance between the first protrusion and the second protrusion is shorter than a distance between the second protrusion and the third protrusion.

10. The position adjusting device of claim 9, wherein the contact hole is defined between the second protrusion and the third protrusion.

11. The position adjusting device of claim 1, wherein the protrusions comprise:
    a first protrusion;
    a second protrusion; and
    a third protrusion disposed adjacent to the second protrusion, the contact member makes contact with the outer circumferential surface of the guide bar through the contact hole defined between the second protrusion and the third protrusion, and a length of the contact member in a direction toward the guide bar is longer than a length of the first to third protrusions in the direction toward the guide bar.

12. The position adjusting device of claim 1, wherein the elastic member is a spring.

13. The position adjusting device of claim 1, wherein the module comprises at least one of an adaptor, a support plate, a guide bar comprising a sub-guide bar required to extend a length of the guide bar, and a seat for children of a stroller.

* * * * *